United States Patent
Kuklinski

[11] Patent Number: 6,065,949
[45] Date of Patent: May 23, 2000

[54] BUBBLE MANIPULATING SYSTEM AND METHOD OF USING SAME TO PRODUCE A SOLID MASS WITH IMBEDDED VOIDS

[75] Inventor: Robert Kuklinski, Portsmouth, R.I.

[73] Assignee: The United States of America as represented by the Secretary of the Navy, Washington, D.C.

[21] Appl. No.: 09/110,736

[22] Filed: Jun. 29, 1998

[51] Int. Cl.[7] .................................................. B28B 1/50
[52] U.S. Cl. ........................ 425/4 R; 425/135; 425/174.2
[58] Field of Search ........................ 210/748; 425/174.2, 425/4 R, 135

[56] References Cited

U.S. PATENT DOCUMENTS

| | | | |
|---|---|---|---|
| 3,663,668 | 5/1972 | Fairbanks | 264/50 |
| 4,055,491 | 10/1977 | Porath-Furedi | 210/19 |
| 4,398,925 | 8/1983 | Trinh et al. | 55/15 |
| 4,759,775 | 7/1988 | Peterson et al. | 55/15 |
| 5,951,456 | 9/1999 | Scott | 516/195 |

*Primary Examiner*—Allan R. Kuhns
*Attorney, Agent, or Firm*—Michael J. McGowan; James M. Kasischke; Prithvi C. Lall

[57] ABSTRACT

A system and method for positioning voids in a medium. A chamber contains the medium, such as a solidifying liquid material, while a source of bubbles disposed at one side of the chamber introduces the bubbles into the chamber. Two or more acoustic wave transmitting devices disposed at respective ones of the sides of the chamber generate and transmit acoustic energy waves at respective frequencies which interact and cooperate to produce a standing wave field in an acoustically active region within the chamber. The standing wave field manipulates the bubbles into a matrix of bubbles having a predetermined spacing. By reducing the temperature of the chamber during the positioning and sizing of the bubbles in a desired pattern within the medium, the medium will be solidified so as to form a solid article with imbedded ordered voids. After solidifying the medium, by increasing the temperature of the sides of the chamber so as to melt the boundary of the solid article, the article will be separated from the chamber.

11 Claims, 6 Drawing Sheets

BUBBLE MANIPULATING SYSTEM AND METHOD OF USING SAME TO PRODUCE A SOLID MASS WITH IMBEDDED VOIDS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates to a system and a method for controlling the positioning of bubbles in a liquid medium using acoustic energy waves, and more particularly, to a system and a method for producing solid mass with an arrangement of voids imbedded within the article.

(2) Description of the Prior Art

Conventional systems for controlling the positioning of bubbles or particles in a liquid medium as, for example, those described in U.S. Pat. No. 4,759,775, comprise transducers which convert electric energy into acoustic energy and transmit acoustic energy waves at various frequencies. The interaction of a pair of the transducers or a transducer and a reflector reflecting the acoustic energy waves from the transducer will establish a standing wave field. The bubbles or particles which were scattered in the liquid medium migrate to nodes and antinodes of the standing wave. Generally, the denser bubbles or particles move to nodes where regional pressures are minimal, and the lighter bubbles or particles move to antinodes where regional pressures are maximum. In this fashion, the bubbles or particles with dissimilar densities can be segregated from the liquid medium using a process known as "frequency sweeping".

Because bubbles can collect at both nodes and antinodes, the location where the bubbles collect is identified as a nodal line or standing domain. However, the conventional systems for controlling the positioning of bubbles or particles using the acoustic energy waves do not position the bubbles or particles in the liquid medium in a desired sequence or arrangement, such as a two-dimensional or three-dimensional grid form. The conventional systems also do not uniformly control the sizing and spacing of the bubbles or particles positioned in the standing wave field within the medium.

The conventional systems and methods for moving bubbles are also limited to a liquid medium and are not capable of producing a solid article having voids of a predetermined size and spacing. Other conventional processes used to produce a large number of uniform holes in a solid medium, such as metal matrix production or sterolithography, are relatively expensive and slow.

SUMMARY OF THE INVENTION

Accordingly, an object of this invention is to provide a system and method to position bubbles uniformly or arbitrarily in the pattern of an ordered grid.

Another object of this invention is to control or alter the sizing and the spacing of the bubbles positioned in the standing wave field, regardless of the effects of flow and gravity.

Another object of this invention is to produce, in a cost effective manner, a large number of bubbles positioned, sized, and spaced in a solidifiable medium without detrimentally affecting the solidification process.

An additional object of this invention is to produce a solid article with imbedded voids positioned, sized, and spaced uniformly or arbitrarily, and possibly containing different types of gas.

Accordingly, this invention features a system and a method for manipulating a plurality of bubbles in a medium. The system comprises a chamber having a plurality of sides defining an internal region that receives the medium. At least one source of bubbles disposed at one of the sides introduces the bubbles into the chamber. At least first and second acoustic wave transmitting devices are disposed at respective sides of the chamber generate and transmit at least first and second acoustic energy waves at respective first and second frequencies.

The first and the second acoustic energy waves interact and cooperate to produce a first component of a standing wave field in an acoustically active region within the chamber. The system further includes third and fourth acoustic wave transmitting devices disposed at respective sides of the chamber, which produce a second component of the standing wave field in the acoustically active region. The standing wave field manipulates the bubbles into a matrix of bubbles having a predetermined spacing.

The method of manipulating a plurality of bubbles in a medium comprises the steps of producing the bubbles in the medium, transmitting acoustic energy waves through the medium where the acoustic energy waves interact to form a standing wave field in the chamber, and controlling the transmission of the acoustic energy waves thereby manipulating the bubbles into a matrix having a predetermined spacing.

The medium can consist of solidifying liquid material and be solidified by disposing a temperature reducer at the sides of the chamber, and by cooling the material while the matrix of bubbles is positioned within the medium. A solidified article with imbedded voids is thereby formed inside the chamber and is separated from the chamber by melting its boundary.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
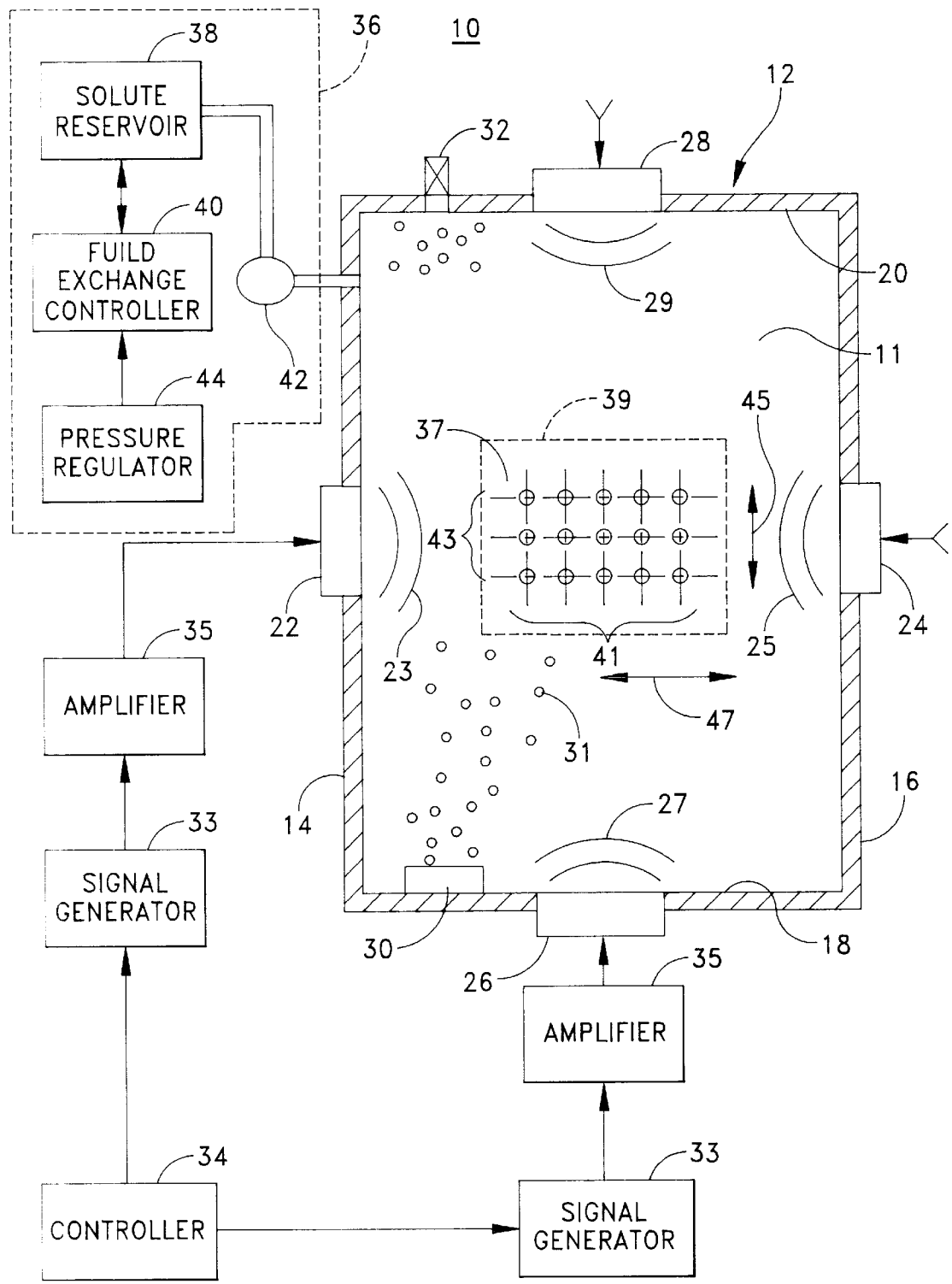
FIG. 1 is a schematic drawing of the system for manipulating bubbles in a medium according to the present invention.

The system 10, FIG. 1, according to the present invention, for manipulating bubbles in a medium 11 comprises a chamber 12 shown in cross section with, for example, at least first through fourth sides 14, 16, 18, 20 containing the medium 11. First through fourth acoustic wave transmitting devices 22, 24, 26, 28 are disposed at the first through fourth sides of the chamber respectively. Also disposed within at least one chamber 12 are source 30 of bubbles 31, at least one bubble absorber 32, and at least one fluid exchange device 36.

In one exemplary embodiment, the medium 11 in the chamber 12 consists of any solidifying liquid material such as liquid aluminum or urethane which can be solidified at a certain temperature to form a solid mass having voids, as will be described in greater detail below. The source 30 of bubbles 31, preferably located proximate the bottom side 18 of the chamber 12, is a pressurized gas source which introduces the bubbles 31 into the medium 11 in the chamber 12. The source 30 of bubbles 31 can provide different types of gas such as nitrogen or helium, to create voids. The bubbles 31 are allowed to rise by gravity to the center region in the medium 11. The bubbles 31 will then collect on the top side 20 of the chamber 12 and be absorbed by the bubble absorber 32.

Opposing acoustic wave transmitting devices 22, 24, 26, 28 generate acoustic energy waves 23, 25, 27 and 29 that produce a standing wave field 37. The first and the second acoustic wave transmitting devices 22, 24 produce a first component 41 of standing wave field 37 oriented in a first direction 45, and the third and the fourth acoustic wave transmitting devices 26, 28 produce a second component 43 of standing wave field 37 oriented in a second direction 47 which is generally orthogonal to the first direction in one embodiment. The first and second components 41, 43 thereby establish the standing wave field 37 in an acoustically active region 39 in the medium 11.

In one embodiment, the first through the fourth acoustic wave transmitting devices 22–28 include respectively first through fourth acoustic wave sources, such as transducers. Each of the acoustic wave transmitting devices 22, 24, 26, 28 or transducers receives an electrical signal generated by a signal generator 33 and amplified by an amplifier 35. Controller 34 controls the frequency of the signals generated by the signal generator 33. The transducers convert the electrical signals from the amplifiers 35 into the acoustic energy waves with certain frequencies controlled by the controller 34.

In another embodiment, the first and the second acoustic wave transmitting devices 22, 24 may include a first transducer 22 and a first reflector 24 respectively, and the third and the fourth acoustic wave transmitting devices 26, 28 may include a second transducer 26 and a second reflector 28. The first and second transducers convert the electrical signals into the acoustic energy waves 23, 27, and the first and the second reflectors reflect the acoustic energy waves 25, 29 from the first and the second transducers respectively to the medium 11 in the chamber 12. The acoustic energy waves 23, 25, 27, 29 generated from the transducers 22, 26 and reflected from the reflectors 24, 28 interact to establish the standing wave field 37.

A fluid exchange device 36 regulates the pressure in the chamber 12 and introduces solute into the chamber 12. The fluid exchange device 36, preferably includes a solute reservoir 38 containing solute, a pump 42 providing the solute into the chamber 12, a pressure regulator 44 regulating the pressure within the chamber 12, and a fluid exchange controller 40 connected to the solute reservoir 38, the pump 42, and the pressure regulator 44. The fluid exchange controller 40 controls the regulation of pressure within the chamber 12 and the introduction of solute into the chamber 12. The pressure inside the chamber 12 will have an effect on establishing the bubble size in the medium. The solute can be introduced into the chamber to change the local mass concentration.

Figure 2A:
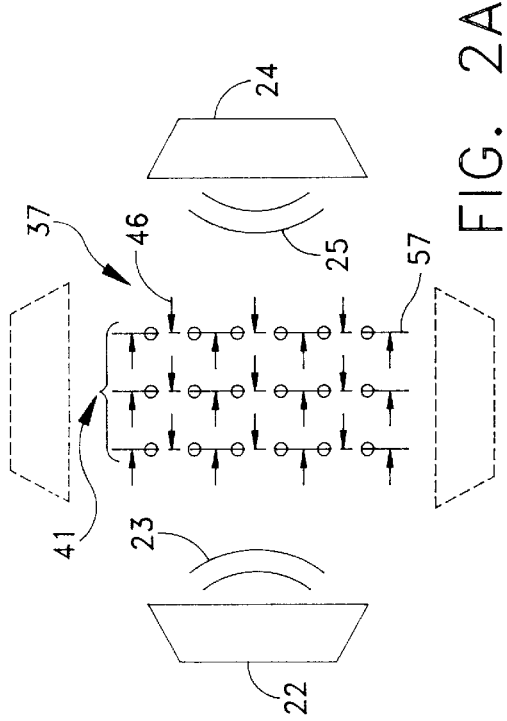
FIGS. 2A–2D are schematic representations of different acoustic wave transmitting devices according to various embodiments of the present invention.
Figure 2B:
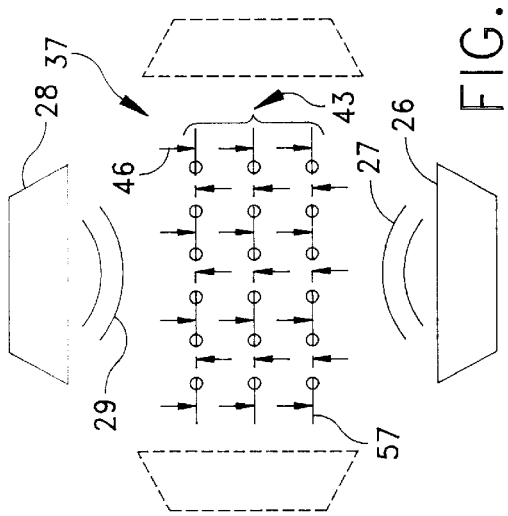
Figure 2C:
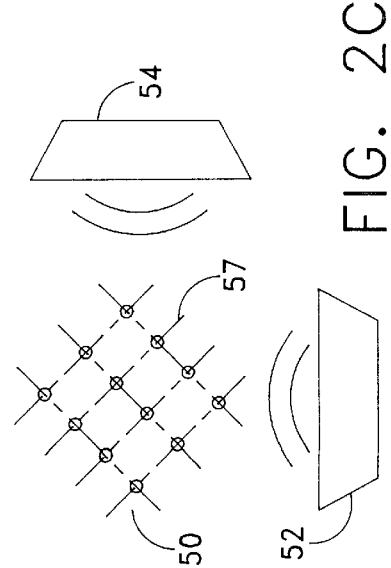
Figure 2D:
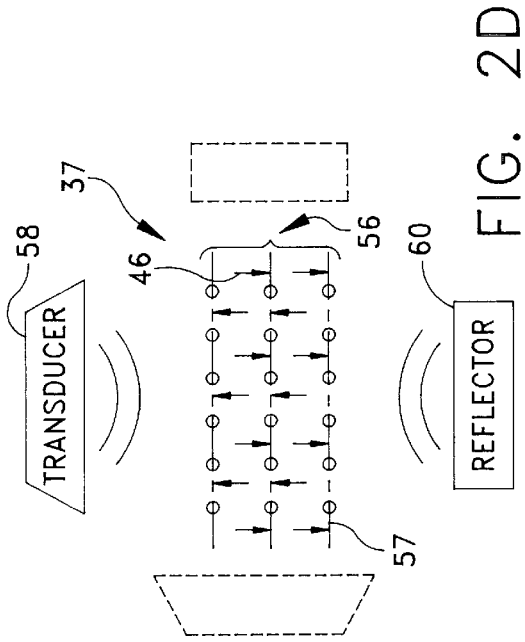

The standing wave field 37, FIGS. 2A–2D, established in the acoustically active region 39 by the acoustic energy waves create forces acting on the bubbles which serve to place or orient the bubbles. FIG. 2A shows the first component 41 of the standing wave field 37 established by the first and the second acoustic wave transmitting devices 22, 24 generating respective acoustic waves 23 and 25. FIG. 2B shows the second component 43 of the standing wave field 37 established by the third and the fourth acoustic wave transmitting devices 26, 28. These devices generate acoustic waves 27 and 29. FIG. 2C shows a standing wave field 50 established by two acoustic wave transmitting devices 52, 54 interfering with each other at a 45° angle to produce a rectangular grid of bubbles. FIG. 2D shows a component of standing wave field 56 established by a transducer 58 and a reflector 60 which reflects the acoustic energy waves from the transducer 58 resulting in the interaction of the reflected acoustic energy waves with the acoustic energy waves transmitted by the transducer 58.

The arrows 46 in FIGS. 2A–2D indicate the directions of the applied forces in the standing wave fields within the chamber. The ultrasonic forces directing toward nodal planes 57 act on the bubbles in the standing wave fields 37. The amount of the force acting on an individual bubble is a function of the intensity of the acoustic transmission, the relative acoustic impedance due to a mismatch between the bubble and the medium, for example, a solidifying liquid material, and the size of the bubble relative to the wavelength of the acoustic energy wave establishing the standing wave field. The amount of the force on a bubble becomes optimal when the diameter of the bubble is approximately one sixth of the distance between two adjacent nodal lines or standing domains. Thus, the size of the bubbles can be a factor of the efficiency of the system for manipulating bubbles.

In order to effectively operate the system, the frequency of the acoustic energy waves is adjusted to accommodate a desired bubble size. For instance, if the diameter of a bubble is much larger than the distance between the adjacent nodal planes, the amount of the force on the bubble will be nearly zero and the bubble will rise through the standing wave field. To the contrary, if the diameter of a bubble is smaller than the distance between the nodal planes, the acoustic force acts to position the bubbles.

Figure 3A:
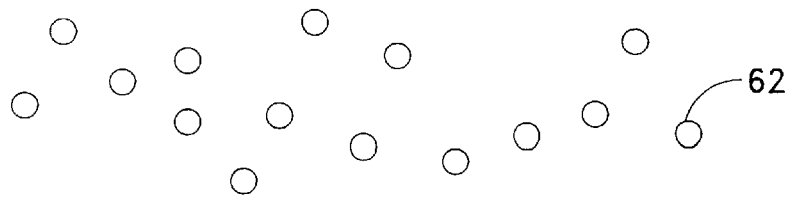
FIGS. 3A–3D are schematic representations of the method for forming the matrix of bubbles by alternating the standing wave fields according to the present invention.
Figure 3B:
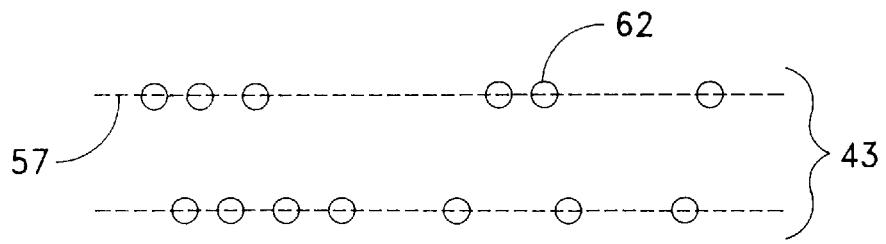

The positioning of the bubbles 31, FIGS. 3A–3D, is performed when they are injected into the medium 11 in the chamber 12. FIG. 3A shows a cloud or group of bubbles 31 in the medium which is acoustically inactive. When at least a pair of acoustic wave transmitting devices (not shown) are turned on and produce at least one component of standing wave field, the cloud of bubbles 62 will be aligned along the nodal planes 57 of the component of the standing wave field. FIG. 3B shows the horizontal nodal planes 57 constituting the component 43 of the standing wave field, on which the bubbles 62 are positioned. However, the bubbles 62 will be positioned not uniformly, but randomly, that is, they may be evenly spaced or clumped as shown in FIG. 3B. Hence if a single component of the standing wave field is used to position the bubbles 31, they will be positioned along the nodal planes with clear spaces between them but not uniformly spaced on the planes.

Figure 3C:
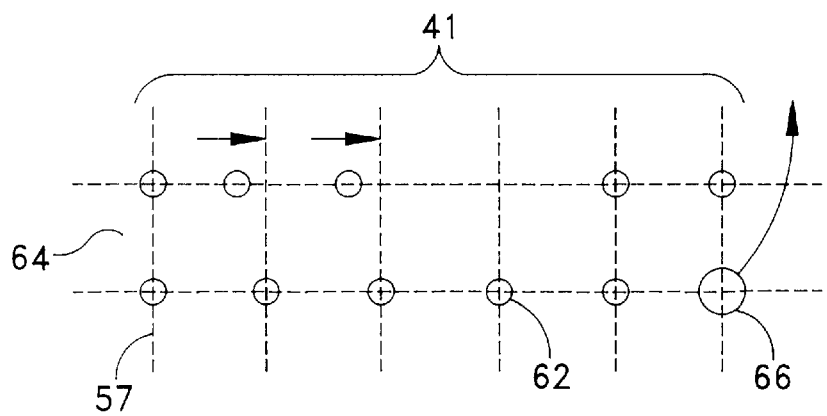

In order to position the bubbles 62 into the form of the matrix 64 as shown in FIG. 3C, the second component 41 of the standing wave field will be applied to the same acoustically active region. The first component is preferably still being applied or cycled on and off rapidly to maintain the approximate vertical position. When the second component 41 of the standing wave field is applied, the bubbles 62 will migrate (vertically in the figure) and establish the desired arrangement. Then bubbles are thereby locked into a predefined arrangement, and any buoyancy effects which may be present are suppressed.

In one example, the time required to position the cloud of bubbles 62 as shown in FIG. 3A into the bubbles 62 along the nodal planes 57 as shown in FIG. 3B or the bubbles 62 in FIG. 3B into those in FIG. 3C, will be about one tenth of a second if the acoustic wave transmitting devices generate the acoustic energy waves at the frequency of one megahertz (1 MHz) and the diameter of the bubbles is two hundred microns (200mu). The motion of the bubbles 62 is slower than the wave speed of sound in a liquid such as water which is 1,500 meters per second. Thus the successive components 41, 43 of the standing wave field may be used to obtain a pattern of bubbles positioned uniformly in the acoustically active region.

Figure 3D:
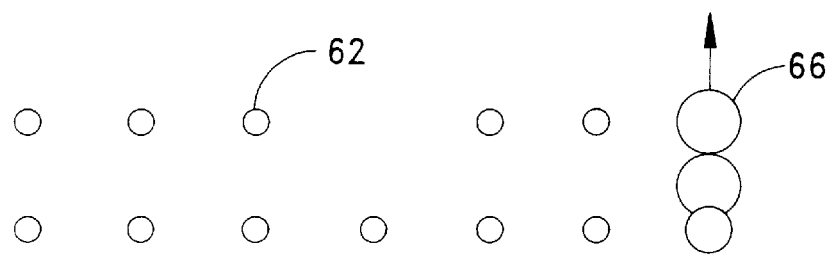

As previously mentioned, the amount of the force acting on large bubbles 66, FIGS. 3C and 3D, having a diameter much larger than the distance between the adjacent nodal planes is nearly zero. So large bubbles 66 will rise out of the matrix and escape the standing wave field region when another force, such as buoyancy, is present. As a result, nearly uniform sized bubbles 62 will remain in the matrix.

In order to further refine the bubble size and to fill in the holes of the matrix, two techniques can be used in the preferred embodiment. The first one is changing the frequency of the acoustic energy waves to allow bubbles above a certain size to escape the standing wave field region. The second technique is introducing dissolved gas into the liquid medium, e.g., from the solute reservoir, so as to change the local mass concentration and the pressure in the liquid medium. In this way the bubbles held in the matrix will grow or shrink in the desired position.

Figure 4A:
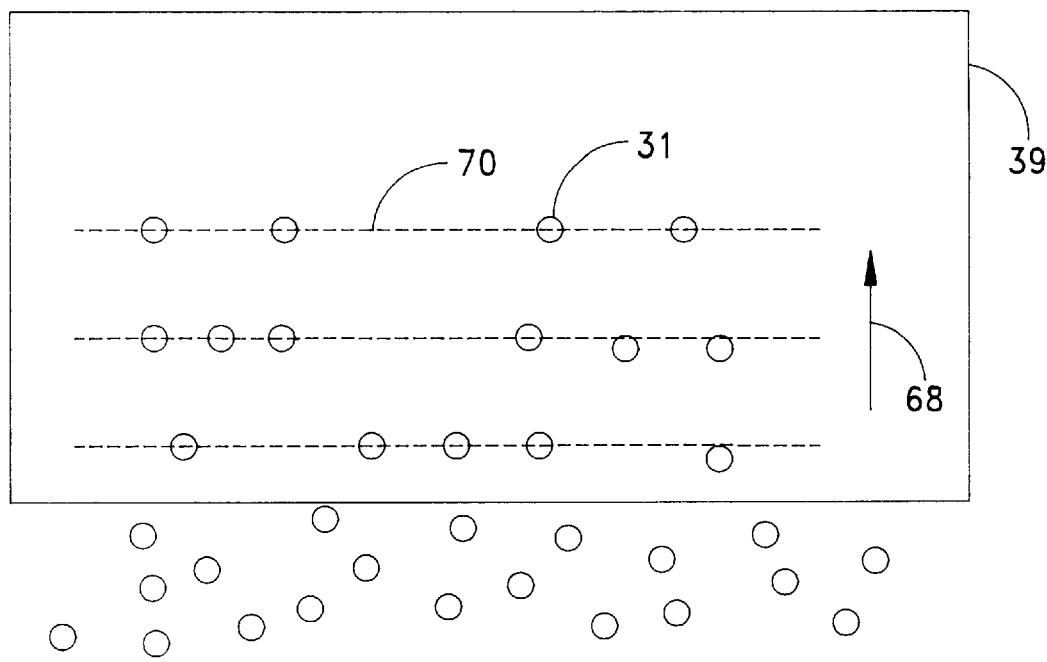
FIGS. 4A–4B are schematic representations of the acoustically active region showing the frequency sweeping of the bubbles according to the present invention.
Figure 4B:
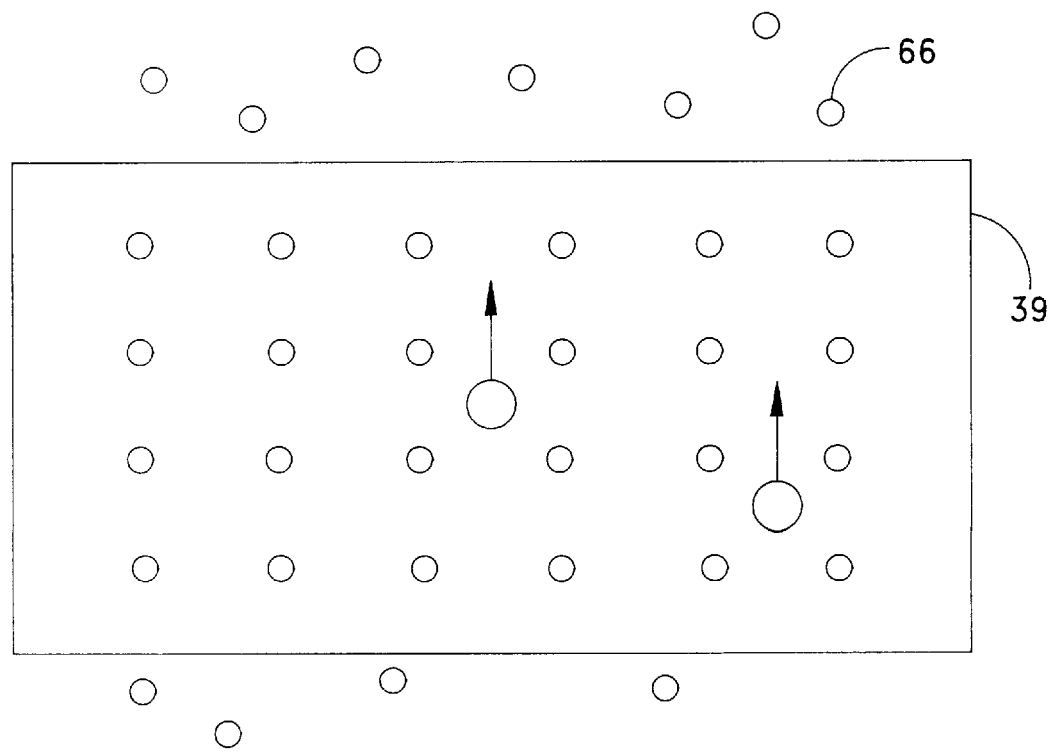

Frequency sweeping of the bubbles 31, FIGS. 4A–4B, is performed in the acoustically active region 39 to fill the region with the bubbles. As the bubbles 31 are introduced into the acoustically active region 39, they are moved via the frequency sweeping techniques as described in U.S. Pat. No. 4,759,775 issued to Peterson et al., incorporated herein by reference, to fill in the matrix roughly as shown in FIG. 4A. The sequence of steps shown in FIGS. 3A–3D is then applied to accommodate the positioning and the sizing of the bubbles. The holes 70 in the nodal planes may be filled in by sweeping of the successive bands of the bubbles in the direction indicated by arrow 68 in FIG. 4A. The large bubbles 66 escape the acoustically active region 39 as shown in FIG. 4B. When the desired arrangement of the bubbles is obtained, the source 30 (FIG. 1) in the bottom side of the chamber can be controlled to stop introducing the bubbles or gases into the chamber. The position of the bubbles in the acoustically active region 39 may be moved by changing the location of the standing wave field, and the size of the bubbles can be changed by diffusion of solute, static pressure or by control of the acoustic energy waves.

Figure 5:
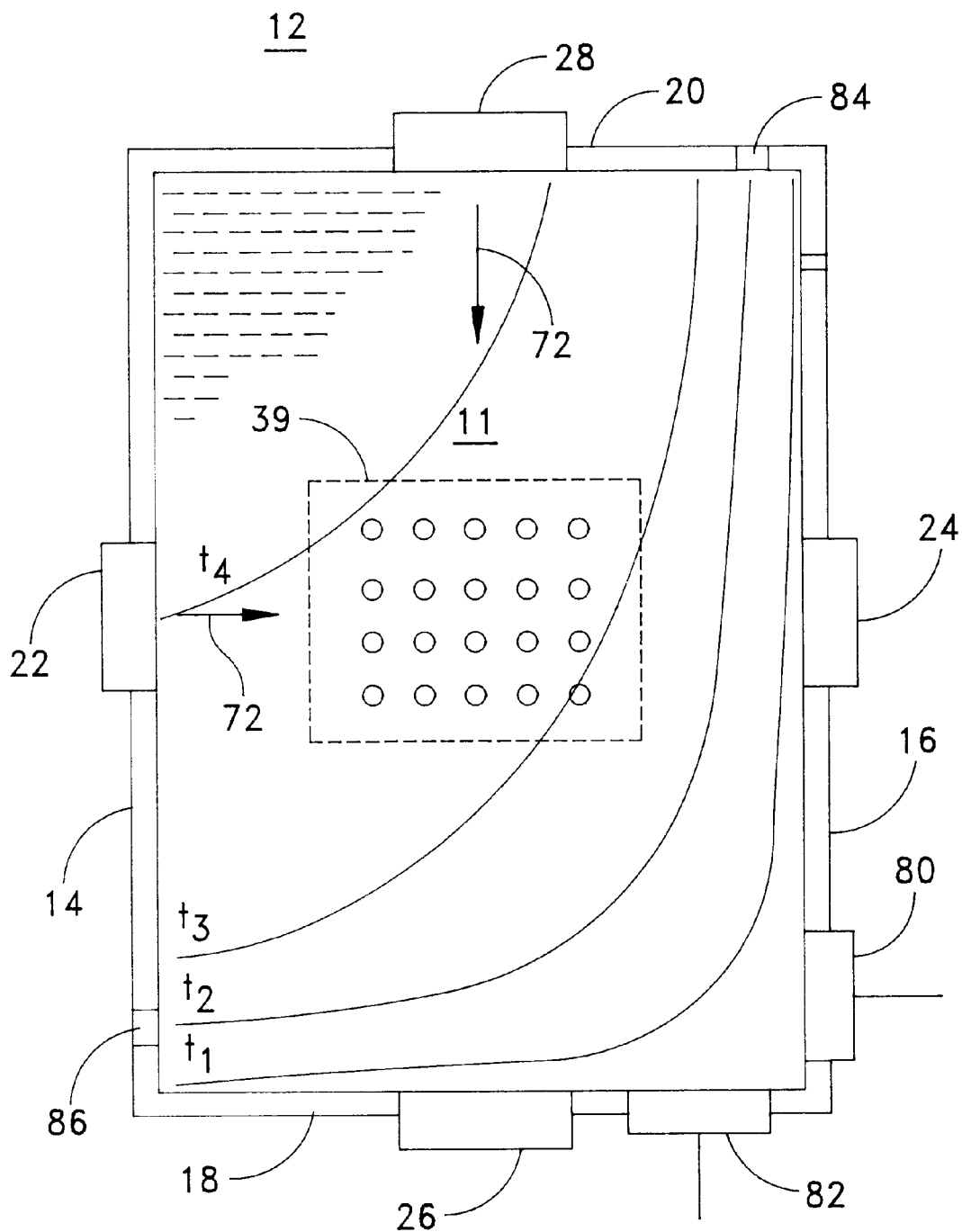
FIG. 5 is a schematic illustration of the chamber in FIG. 1 showing the solidification of the medium according to one embodiment of the present invention.

In the exemplary embodiment, the chamber 12, FIG. 5, includes a solidifying liquid medium 11 such as urethane. For the process of the solidification, the chamber 12 preferably includes first and second temperature reducers 80 and 82 on the second and the third sides 16, 18 of the chamber 12 respectively. These can be thermoelectric devices, evaporators or other controllable cooling means known in the art. Temperature reducers are joined to a controller such as 34. The chamber 12 also includes first and second thermal insulators 84 and 86 on the first and the fourth sides 14, 20 of the chamber respectively to insulate sides 14 and 20 from temperature reducers 80 and 82. At time zero, the medium 11 within the chamber 12 entirely consists of liquid and bubbles, or gases or other particles if necessary. The medium 11 is cooled by reducing the temperature of the chamber via the first and second temperature reducers 80 and 82 on the second and third sides 16, 18. Then the solidification of the medium in the chamber begins. The location of the phase front of the solidified medium progressively moves according to the progress of time $t_1$, $t_2$, $t_3$, and $t_4$ as shown in FIG. 5. As the phase front of the solidified medium moves across the acoustically active region 39, a solid mass or article with the embedded, ordered bubbles is formed.

During the solidification, a fluid path 72 should exist between the first and fourth acoustic wave transmitting devices 22, 28 and the bubbles in the acoustically active region 39. The fluid path 72 allows for programmed changes in the bubble size to occur during the solidification using the techniques described above. The effects of the injection of the solute into the medium may also be controlled via this path 72.

Figure 6:
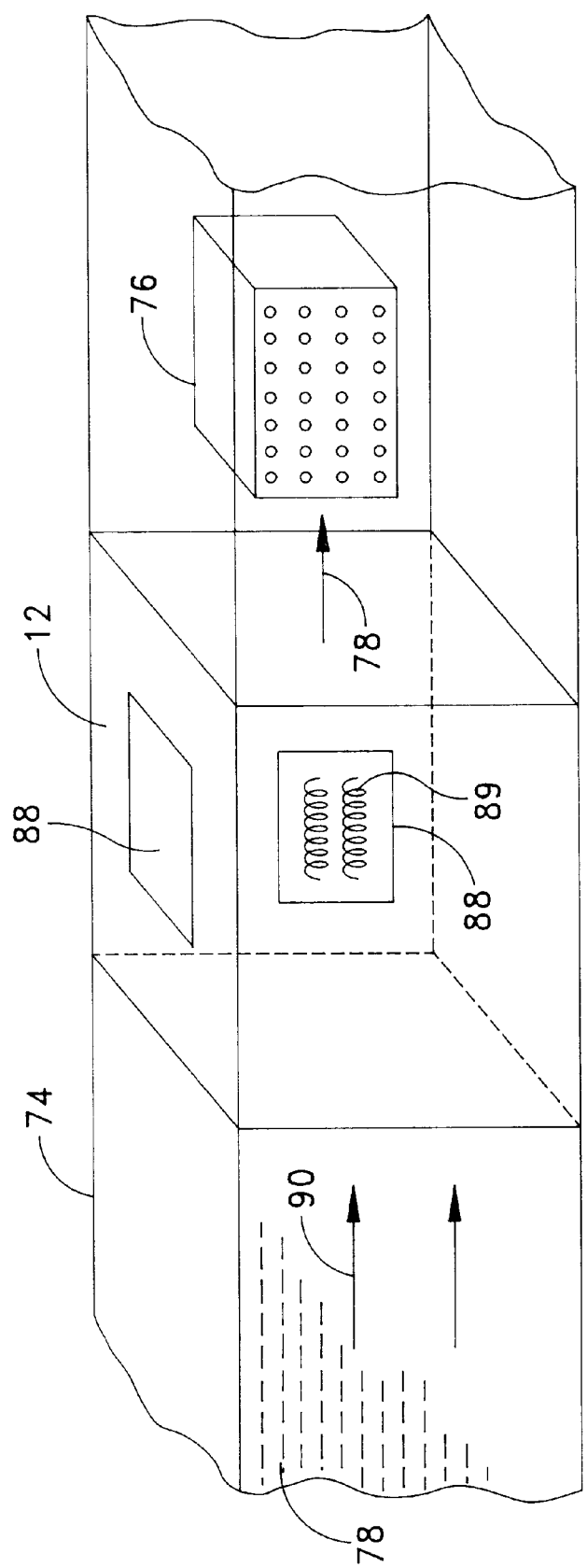
FIG. 6 is a schematic perspective view of the method of producing solid articles with imbedded voids, according to one embodiment of the present invention.

According to the exemplary embodiment, the chamber 12, FIG. 6, is used in a duct 74 to process quantities of the solidifying medium in batches. For separation of a solid article 76, the chamber 12 includes at least one melting device 88 disposed on at least one of its sides. The melting device 88 preferably includes at least one heating coil or element 89 covering at least a portion of the side. Melting device 88 can be controlled by a suitable controller or controlled manually. After the solid article 76 with the embedded bubbles is formed, the melting device 88 provides heat to the side of the chamber so as to melt the boundary of the solid article 76. The solid article 76 is then separated from the chamber 12.

As shown in FIG. 6, the solidifying medium filled in the chamber may be provided via melt flow 78 which continuously flows in the direction indicated by arrow 90 through the duct 74. When the melt flow 78 is disposed in the chamber 12, the predetermined arrangement of bubbles is formed. The chamber 12 then solidifies the medium and then separates the solidified medium from the chamber 12. Thereby the chamber 12 may process and produce a large quantity of solid articles having a predetermined arrangement of imbedded voids.

The system and method of the present invention can ultimately produce a solid mass or article with imbedded voids desirably arranged by positioning, sizing and spacing a plurality of bubbles in the standing wave fields established in a solidifying medium by acoustic energy waves. The system and method of the present invention is especially effective when it is used in a duct through which a melt flow consisting of solidifiable liquid flows into the chamber, thereby it can produce a large quantity of the solid articles. This invention can work with any type of medium which may be solidified and with any type of gas bubbles.

In light of the above, it is therefore understood that within the scope of the appended claims, the invention may be practiced otherwise than as specifically described.

What is claimed is:

1. A system for positioning voids within a solidifying, liquid medium, said system comprising:

a chamber having a plurality of sides defining an internal region and a cooling device joined to at least one of said plurality of sides, for cooling said solidifying liquid material and causing solidification of said solidifying liquid material, said chamber being a conduit having at least four walls for receiving said medium;

at least one source of bubbles disposed proximate one of said plurality of sides, for introducing a plurality of bubbles into said chamber, said bubble source being positioned in a lowest wall of said chamber for allowing bubbles to flow upward through said acoustic region;

at least first and second acoustic wave transmitting devices disposed proximate first and second sides of said plurality of sides of said chamber, for transmitting at least first and second acoustic energy waves at respective first and second frequencies; and wherein said first and second acoustic energy waves interact and cooperate to produce a standing wave field in an acoustically active region within said chamber, said standing wave field manipulating at least a portion of said plurality of bubbles into a matrix of bubbles having a predetermined spacing.

2. The system of claim 1 wherein said chamber includes a thermal insulator covering at least a portion of at least another of said plurality of sides for insulating said other side from said cooling device.

3. The system of claim 2 wherein said chamber includes at least first, second, third and fourth sides, said cooling device joined to said first and second sides, and said thermal insulator emplaced on said third and fourth sides opposite said first and second sides.

4. The apparatus of claim 1 further comprising a bubble collector positioned in a topmost wall of said chamber for removing bubbles.

5. A system for positioning voids within a medium, said system comprising:

a chamber having a plurality of sides defining an internal region, for receiving said medium;

at least one source of bubbles disposed proximate one of said plurality of sides, for introducing a plurality of bubbles into said chamber;

at least first and second acoustic wave transmitting devices disposed proximate first and second sides of said plurality of sides of said chamber, for transmitting at least first and second acoustic energy waves at respective first and second frequencies, said first and second acoustic energy waves interact and cooperate to produce a standing wave field in an acoustically active region within said chamber, said standing wave field manipulating at least a portion of said plurality of bubbles into a matrix of bubbles having a predetermined spacing; and at least third and fourth acoustic wave transmitting devices, wherein said first and second acoustic wave transmitting devices are disposed on first and second opposing sides, for producing a first component of said standing wave field oriented in a first direction, and wherein said third and fourth acoustic wave transmitting devices are disposed on third and fourth opposing sides, for producing a second component of said standing wave field oriented in a second direction generally orthogonal to said first direction.

6. The system of claim 5 wherein said first and second acoustic wave transmitting devices include a transducer and a reflector positioned on sides directly opposite one another, wherein said transducer generates said first acoustic energy wave which is transmitted to said reflector, and said reflector reflects said first acoustic energy wave to produce said second acoustic energy wave resulting in a first component of said standing wave field.

7. The system of claim 6 wherein said third and fourth acoustic wave transmitting devices include a transducer and a reflector positioned on sides directly opposite one another, wherein said transducer generates a third acoustic energy wave which is transmitted to said reflector, and said reflector reflects said third acoustic energy wave to produce a fourth acoustic energy wave resulting in a second component of said standing wave field.

8. The system of claim 5 further including a controller coupled to said first, second, third, and fourth acoustic wave sources, for selectively activating said first and second acoustic wave transmitting devices to generate said first component of said standing wave field, and said third and fourth acoustic wave transmitting devices to generate said second component of said standing wave field.

9. The system of claim 5 further including a fluid exchange device, disposed on said chamber for introducing solute into said chamber.

10. The system of claim 9 wherein said fluid exchange device includes:

at least one solute reservoir containing said solute;

a pump connected to said solute reservoir, for providing said solute from said solute reservoir into said chamber;

a pressure regulator joined between said pump and said chamber for regulating the pressure inside said chamber; and a fluid exchange controller connected to said solute reservoir, said pump, and said pressure regulator, for controlling pumping of said solute from said solute reservoir into said chamber in response to said pressure regulator.

11. The system of claim 5 further including a melting device disposed on said chamber sides, for melting a boundary of a solid article solidified in said chamber.

* * * * *